(12) United States Patent
Hwang

(10) Patent No.: US 12,176,704 B2
(45) Date of Patent: Dec. 24, 2024

(54) POWER SUPPLY APPARATUS AND A VEHICLE COMPRISING THE SAME

(71) Applicants: HYUNDAI MOTOR COMPANY, Seoul (KR); KIA CORPORATION, Seoul (KR)

(72) Inventor: Sooncheol Hwang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 28 days.

(21) Appl. No.: 18/209,536

(22) Filed: Jun. 14, 2023

(65) Prior Publication Data

US 2024/0146052 A1  May 2, 2024

(30) Foreign Application Priority Data

Oct. 27, 2022  (KR) .................. 10-2022-0140326

(51) Int. Cl.
*B60W 10/04* (2006.01)
*B60R 16/033* (2006.01)
*H02J 1/00* (2006.01)

(52) U.S. Cl.
CPC .............. *H02J 1/00* (2013.01); *B60R 16/033* (2013.01)

(58) Field of Classification Search
CPC .................................. H02J 1/00; B60R 16/033
See application file for complete search history.

(56) References Cited

U.S. PATENT DOCUMENTS

| | | | |
|---|---|---|---|
| 12,046,897 B2* | 7/2024 | Pmsvvsv | H02J 1/102 |
| 2019/0077401 A1* | 3/2019 | Katagiri | B60W 10/18 |
| 2022/0063414 A1 | 3/2022 | Kim et al. | |
| 2022/0091193 A1 | 3/2022 | Kwon et al. | |
| 2022/0415598 A1 | 12/2022 | Kim | |
| 2023/0006442 A1* | 1/2023 | Kudo | H02J 3/32 |
| 2023/0024492 A1* | 1/2023 | Arazm | H02M 7/4835 |
| 2024/0253692 A1* | 8/2024 | Hopperdietzel | H02P 27/06 |

FOREIGN PATENT DOCUMENTS

| | | |
|---|---|---|
| KR | 20220026873 A | 3/2022 |
| KR | 20220032362 A | 3/2022 |
| KR | 20220039089 A | 3/2022 |
| KR | 20230001719 A | 1/2023 |

* cited by examiner

*Primary Examiner* — Jared Fureman
*Assistant Examiner* — Esayas G Yeshaw
(74) *Attorney, Agent, or Firm* — Lempia Summerfield Katz LLC

(57) ABSTRACT

A power supply apparatus includes: a first battery configured to supply power; a first converter configured to step down a voltage output from the first battery to a first voltage; a second converter configured to step down the voltage output from the first battery to a second voltage lower than the first voltage; a third converter configured to convert the first voltage into the second voltage; a fourth converter configured to convert the second voltage into the first voltage; a first controller configured to supply the first voltage output from the first converter to at least one of a first load or the third converter; and a second controller configured to supply the second voltage output from the second converter to at least one of a second load or the fourth converter.

20 Claims, 11 Drawing Sheets

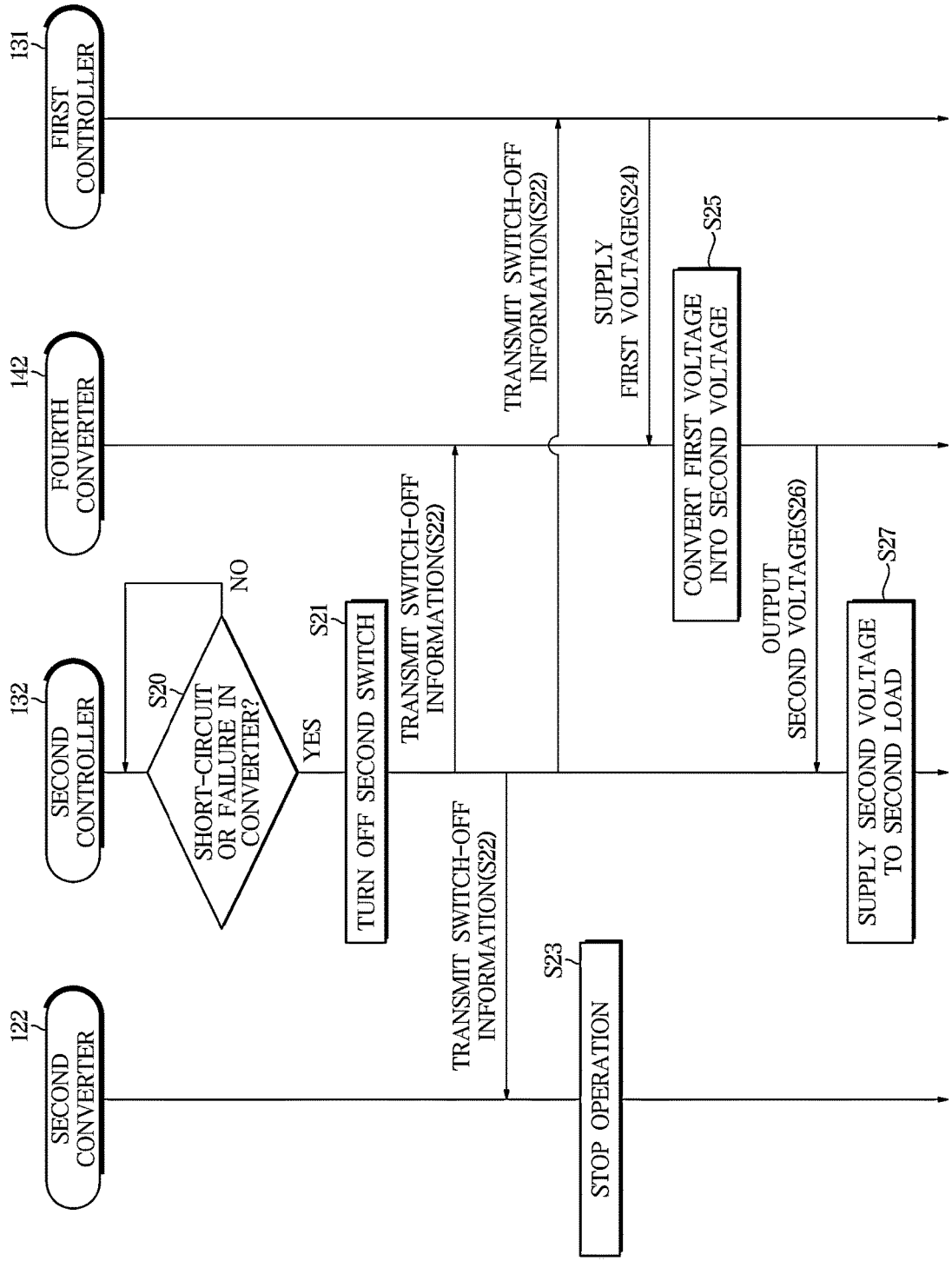

POWER SUPPLY APPARATUS AND A VEHICLE COMPRISING THE SAME

CROSS-REFERENCE TO RELATED APPLICATION

This application claims priority to Korean Patent Application No. 10-2022-0140326, filed on Oct. 27, 2022, the disclosure of which is incorporated herein by reference.

BACKGROUND

1. Technical Field

The disclosure relates to a power supply apparatus applied to a vehicle and a vehicle comprising the same.

2. Description of the Related Art

In general vehicle systems, when a vehicle malfunctions, a driver may decide to stop the vehicle. In an autonomous vehicle system of an autonomous vehicle, however, when an open-circuit, short-circuit, or the like, occurs in power systems, the autonomous vehicle may suddenly stop during driving.

To overcome such disadvantages and travel to a destination without a driver's intervention even when a failure occurs, a redundancy technology using redundant power supply devices and electronic control unit (ECU) performing emergency driving is used in an autonomous vehicle system.

SUMMARY

An aspect of the disclosure provides a power supply apparatus that may supply backup power in the event of vehicle power failure and a vehicle comprising the same.

Additional aspects of the disclosure are set forth in part in the description which follows and, in part, should be apparent from the description, or may be learned by practice of the disclosure.

According to an embodiment of the disclosure, a power supply apparatus is provided. The power supply apparatus includes: a first battery configured to supply power; a first converter configured to step down a voltage output from the first battery to a first voltage; and a second converter configured to step down the voltage output from the first battery to a second voltage that is lower than the first voltage. The power supply apparatus further includes: a third converter configured to convert the first voltage into the second voltage; a fourth converter configured to convert the second voltage into the first voltage; and a first controller configured to supply the first voltage output from the first converter to at least one of a first load or the third converter. The power supply apparatus further includes a second controller configured to supply the second voltage output from the second converter to at least one of a second load or the fourth converter.

The power supply apparatus further includes a first switch configured to connect the first converter and the first load. The first controller is configured to determine whether a failure or short-circuit occurs in the first converter based on a signal received from the first converter and control the first switch based on the determination.

When the first switch is turned off, the first controller is configured to transmit a first switch-off signal to at least one of the first converter, the second controller, or the third converter.

The first converter is configured to stop stepping down the voltage, in response to receiving the first switch-off signal from the first controller.

The second controller is configured to supply the second voltage to the third converter, in response to receiving the first switch-off signal from the first controller.

The third converter is configured to convert the second voltage into the first voltage, in response to receiving the first switch-off signal from the first controller.

The first controller is configured to supply the first load with the first voltage converted by at least one of the third converter or the fourth converter.

The power supply apparatus further includes a second switch configured to connect the second converter and the second load. The second controller is configured to determine whether a failure or short-circuit occurs in the second converter based on a signal received from the second converter and control the second switch based on the determination.

When the second switch is turned off, the second controller is configured to transmit a second switch-off signal to at least one of the second converter, the first controller, or the fourth converter.

The second converter is configured to stop stepping down the voltage, in response to receiving the second switch-off signal from the second controller.

The first controller is configured to supply the first voltage to the fourth converter, in response to receiving the second switch-off signal from the second controller.

The fourth converter is configured to convert the first voltage into the second voltage, in response to receiving the second switch-off signal from the second controller.

The second controller is configured to supply the second load with the second voltage converted by at least one of the third converter or the fourth converter.

The power supply apparatus further includes a power distributor configured to distribute the voltage. The power distributer is configured to distribute the first voltage and the second voltage supplied from the first controller and the second controller to a third load and a fourth load.

The power supply apparatus further includes a first switch configured to connect the first converter and the first load. The first controller is configured to determine whether a failure or short-circuit occurs in the first converter based on a signal received from the first converter, and control the first switch based on the determination. The power distributor is configured to distribute a voltage to only a predetermined load, in response to receiving a first switch-off signal from the first controller.

The power supply apparatus further includes a second switch configured to connect the second converter and the second load. The second controller is configured to determine whether a failure or short-circuit occurs in the second converter based on a signal received from the second converter, and control the second switch based on the determination, and the power distributor is configured to distribute a voltage to only a predetermined load, in response to receiving a second switch-off signal from the second controller.

According to an embodiment of the present disclosure, a vehicle includes: a first battery configured to supply power; a first converter configured to step down a voltage output from the first battery to a first voltage; and a second converter configured to step down the voltage output from the first battery to a second voltage which is lower than the first voltage. The vehicle further includes: a third converter configured to convert the first voltage into the second voltage; a fourth converter configured to convert the second voltage into the first voltage; a first controller configured to supply the first voltage output from the first converter to at least one of a first load or the third converter; and a second controller configured to supply the second voltage output from the second converter to at least one of a second load or the fourth converter.

The vehicle further includes a first switch configured to connect the first converter and the first load. The first controller is configured to: determine whether a failure or short-circuit occurs in the first converter based on a signal received from the first converter; control the first switch based on the determination; and transmit a first switch-off signal to at least one of the first converter, the second controller, or the third converter, in response to the first switch being turned off.

The first converter is configured to stop stepping down the voltage, in response to receiving the first switch-off signal from the first controller.

The second controller is configured to supply the second voltage to the third converter, in response to receiving the first switch-off signal from the first controller. The third converter is configured to convert the second voltage into the first voltage, in response to receiving the first switch-off signal from the first controller. The first controller is configured to supply the first load with the first voltage converted by at least one of the third converter or the fourth converter.

The vehicle further includes a second switch configured to connect the second converter and the second load. The second controller is configured to: determine whether a failure or short-circuit occurs in the second converter based on a signal received from the second converter; control the second switch based on the determination; and transmit a second switch-off signal to at least one of the second converter, the first controller, or the fourth converter, in response to the second switch being turned off.

The second converter is configured to stop stepping down the voltage, in response to receiving the second switch-off signal from the second controller.

The first controller is configured to supply the first voltage to the fourth converter, in response to receiving the second switch-off signal from the second controller. The fourth converter is configured to convert the first voltage into the second voltage, in response to receiving the second switch-off signal from the second controller. The second controller is configured to supply the second load with the second voltage converted by at least one of the third converter or the fourth converter.

BRIEF DESCRIPTION OF THE DRAWINGS

These and/or other aspects of the disclosure should become apparent and more readily appreciated from the following description of embodiments, taken in conjunction with the accompanying drawings of which:

FIG. 11 is a flowchart illustrating an example of a control method in an event of failure in a second converter, in a power supply apparatus according to an embodiment.

DETAILED DESCRIPTION

Figure 1:
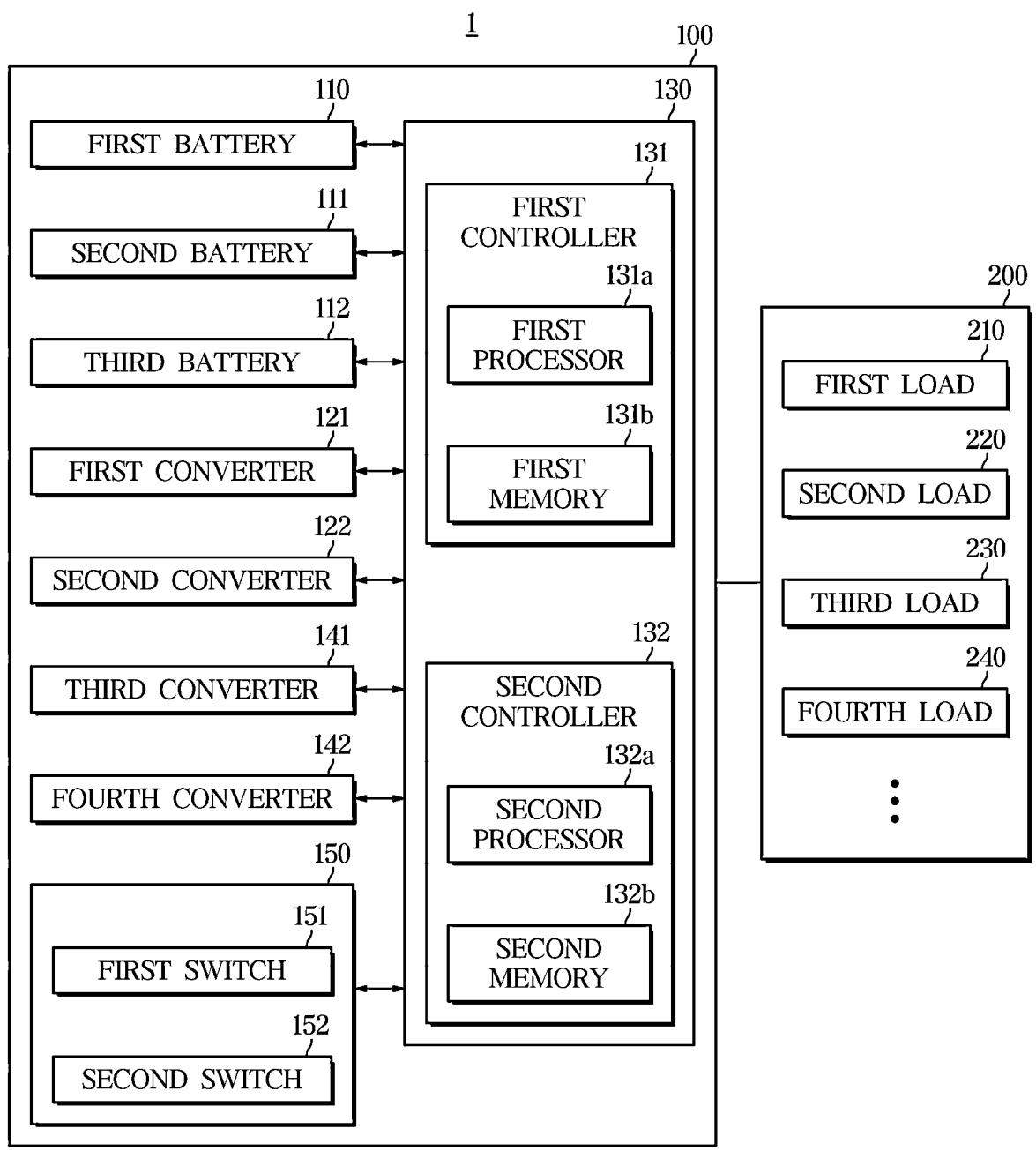
FIG. 1 is a control block diagram illustrating a power supply apparatus and loads in a vehicle according to an embodiment.

The embodiments set forth herein and illustrated in the configuration of the present disclosure are only example embodiments. It should be understood that the embodiments set forth herein may be replaced with various equivalents and modifications at the time of the present disclosure.

Like reference numerals throughout the specification denote like elements.

Terminologies used herein are for the purpose of describing particular embodiments only and are not intended to limit the disclosure. It should be understood that the singular forms are intended to include the plural forms as well unless the context dictates otherwise.

It should be further understood that the terms "include", "comprise" and/or "have" and variations thereof, when used in this specification, specify the presence of stated features, integers, steps, operations, elements, and/or components, but do not preclude the presence or addition of one or more other features, integers, steps, operations, elements, components, and/or groups thereof.

Although the terms first, second, and the like, may be used herein to describe various elements, these elements should not be limited by these terms.

For example, without departing from the technical spirit or essential features of the disclosure, a first element may be referred to as a second element, and also a second element may be referred to as a first element. The term "and/or" includes any and all combinations of one or more of the associated listed items.

Further, the terms such as "part", "device", "block", "member", "module", and the like may refer to a unit for processing at least one function or act. For example, the terms may refer to at least one process processed by at least one hardware, such as field-programmable gate array (FPGA)/application-specific integrated circuit (ASIC), software stored in memories, or processors.

Reference numerals used for method steps are just used for convenience of explanation, but not to limit an order of the steps. Thus, unless the context dictates otherwise, the written order may be practiced otherwise.

The term "at least one" used herein includes any and all combinations of the associated listed items. For example, it should be understood that the term "at least one of A, B, or C" may include only A, only B, only C, both A and B, both A and C, both B and C, or all of A, B and C.

When a component, device, element, or the like, of the present disclosure, is described as having a purpose or performing an operation, function, or the like, the component, device, or element should be considered herein as being "configured to" meet that purpose or to perform that operation or function.

Hereinafter, a power supply apparatus and a vehicle comprising the same are described in detail with reference to the accompanying drawings.

FIG. 1 is a control block diagram illustrating a power supply apparatus and loads in a vehicle according to an embodiment.

Referring to FIG. 1, a power supply apparatus 100 may be mounted in a vehicle 1 to supply or block power to loads of the vehicle 1. Here, the vehicle 1 refers to an electrified vehicle 1 such as an electric vehicle (EV), a hybrid electric vehicle (HEV), a plug-in hybrid electric vehicle (PHEV), and the like.

The power supply apparatus 100 includes a first battery 110, a second battery 111, a third battery 112, a first converter 121, a second converter 122, a first controller 131, a second controller 132, a third converter 141, a fourth converter 142, a first switch 151 and a second switch 152.

The first battery 110 may be provided in the vehicle 1 to supply power to a motor generating a driving force of the vehicle 1. For example, the first battery 110 may be a high-voltage battery, include an auxiliary battery, and output a voltage of 600V to 800V.

The first battery 110 may be connected to the first converter 121 and the second converter 122. Here, connection may refer to a state where voltage may be supplied by being electrically connected between one end of the first battery 110 and one end of the converter.

The second battery 111 and the third battery 112 may store the power supplied from the first battery 110, and supply the stored power to each of a first load 210 and a second load 220.

The first converter 121 and the second converter 122 may be electrically connected to the first battery 110 to step down a voltage supplied from the first battery 110.

The first converter 121 may include a high-voltage terminal electrically connected to the first battery 110, and a low-voltage terminal stepping down the voltage supplied from the first battery 110 and outputting the step-down voltage. For example, the high-voltage terminal of the first converter 121 may be connected to the first battery 110, and the low-voltage terminal of the first converter 121 may be connected to the first controller 131, step down the high voltage input from the first battery 110 to a first voltage, and output the first voltage to the first controller 131.

The second converter 122 may include a high-voltage terminal electrically connected to the first battery 110, and a low-voltage terminal stepping down the voltage supplied from the first battery 110 and outputting the step-down voltage. For example, the high-voltage terminal of the second converter 122 may be connected to the first battery 110, and the low-voltage terminal of the second converter 122 may be connected to the second controller 132, step down the high voltage input from the first battery 110 to a second voltage and output the second voltage to the first controller 131. The second voltage refers to a voltage lower than the first voltage. For example, the first voltage may be 24V and the second voltage may be 12V.

The first converter 121 and the second converter 122 may be implemented in a structure where a half/full bridge converter and a rectifier are connected, without being limited thereto. In other words, structures of an existing converter and a converter to be developed later may be applied to the first converter 121 and the second converter 122. The first converter 121 and the second converter 122 may include low-voltage direct current (LDC) converters.

The first controller 131 and the second controller 132 may include at least one processor and memory. For example, the first controller 131 and the second controller 132 may include an electronic control unit (ECU), a microcontroller unit (MCU), or other sub-controllers mounted on the vehicle 1. The first controller 131 and the second controller 132 may include an adaptive junction box.

The processor may refer to a central processing unit (CPU), or at least one dedicated processor performing operations of the apparatus and/or performing a method according to embodiments of the disclosure.

A processor 131a of the first controller 131 may process a signal received from the first converter 121. Accordingly, the processor 131a of the first controller may determine whether a failure occurs in the first converter 121, e.g., an output error, short-circuit, and the like, in the first converter 121, based on processing of the signal received from the first converter 121.

Also, the processor 131a of the first controller 131 may generate a signal for controlling the constituent components of the power supply apparatus 100 in response to determining whether a failure occurs in the first converter 121. For example, the processor 131a may generate a control signal for turning on or off an operation of the first converter 121, a control signal for turning on or off the first switch 151, and the like.

A processor 132a of the second controller 132 may determine whether a failure occurs in the second converter 122, (e.g., an output error, short-circuit, and the like) in the second converter 122, based on processing of a signal received from the second converter 122.

Also, the processor 132a of the second controller may generate a signal for controlling the constituent components of the power supply apparatus 100 in response to determining whether a failure occurs in the second converter 122. For example, the processor 132a may generate a control signal for turning on or off an operation of the second converter 122, a control signal for turning on or off the second switch 152, and the like.

The processor 131a of the first controller 131 and the processor 132a of the second controller 132 may execute a program command stored in the memory of each of the controllers.

A memory 131b of the first controller 131 and a memory 132b of the second controller 132 may be implemented as volatile or non-volatile recording medium. For example, the memory may be implemented as a read-only memory (ROM) and/or random-access memory (RAM).

The memory 131b of the first controller 131 and a memory 132b of the second controller 132 may store at least one command. More specifically, the memory may store at least one command executed by the processor. For example, the memory 131b of the first controller 131 may include a command for turning on or off an operation of the first converter 121, a command for turning on or off the first switch 151, and the like. The memory 132b of the second controller 132 may include a command for turning on or off an operation of the second converter 122, a command for turning on or off the second switch 152, and the like.

However, commands included in the memories 131b and 131b are not limited thereto, and commands related to operations to be described later may be included in the memories 131b and 131b. The processor may execute a program related to the above-described operations and operations to be described later. Also, the memory may store at least one piece of data calculated by execution of the processor.

Each of the third converter 141 and the fourth converter 142 may be electrically connected to the controller and convert a voltage supplied from the controller.

The third converter 141 may include a first voltage terminal electrically connected to the first controller 131, and a second voltage terminal converting and outputting the voltage supplied from the first controller 131. For example, the first voltage terminal of the third converter 141 may be connected to the first controller 131 and the second voltage terminal of the third converter 141 may be connected to the second controller 132, thereby converting the first voltage input from the first controller 131 into the second voltage and outputting to the second controller 132, and converting the second voltage input from the second controller 132 into the first voltage and outputting to the first controller 131.

The fourth converter 142 may include a first voltage terminal electrically connected to the first controller 131, and a second voltage terminal electrically connected to the second controller 132. For example, the first voltage terminal of the fourth converter 142 may be connected to the first controller 131 and the second voltage terminal of the fourth converter 142 may be connected to the second controller 132, thereby converting the second voltage input from the second controller 132 into the first voltage and outputting to the first controller 131, and converting the first voltage input from the first controller 131 into the second voltage and outputting to the second controller 132.

The third converter 141 and the fourth converter 142 may be implemented in a structure where a half/full bridge converter and a rectifier are connected, without being limited thereto. In other words, structures of an existing converter and a converter to be developed later may be applied to the third converter 141 and the fourth converter 142. The first converter 121 and the second converter 122 may include LDC converters.

The first switch 151 may turn on or off the connection between the first controller 131 and the first load 210. The first switch 151 may be turned on or off according to a command of the first controller 131.

For example, in a normal power state, the first switch 151 may be turned on to supply power to the first load 210, and in a power failure state, the first switch 151 may be turned off to cut off power to the first load 210.

The second switch 152 may turn on or off the connection between the second controller 132 and the second load 220. The second switch 152 may be turned on or off according to a command of the second controller 132.

For example, in a normal power state, the second switch 152 may be turned on to supply power to the second load 220, and in a power failure state, the second switch 152 may be turned off to cut off power to the second load 220.

Hereinafter, the configuration of the power supply apparatus 100 is described for each example with reference to FIGS. 2-9.

Figure 2:
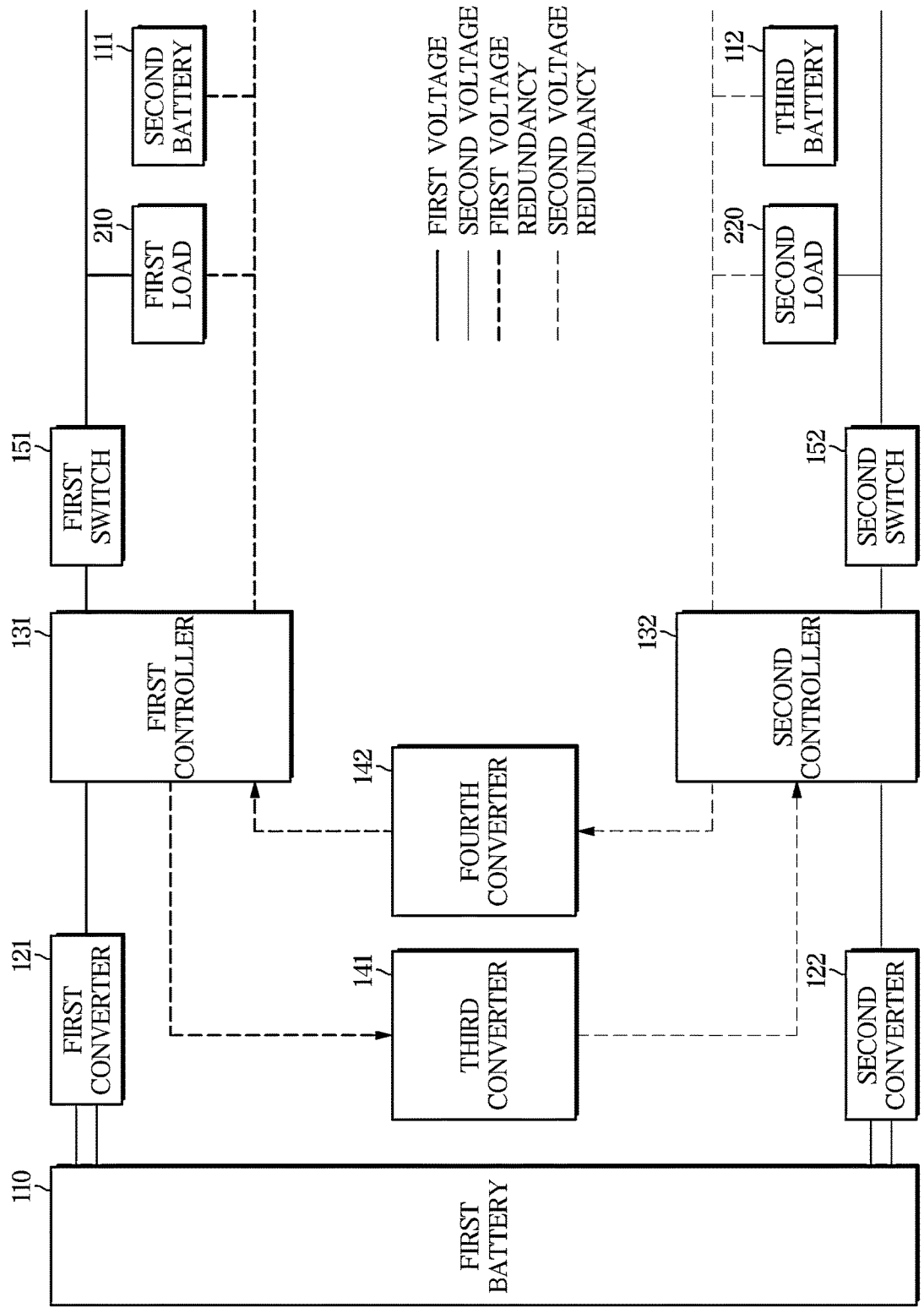
FIG. 2 is a conceptual diagram illustrating an example of a configuration of a power supply apparatus according to an embodiment.

FIG. 2 is a conceptual diagram illustrating an example of a configuration of a power supply apparatus according to an embodiment.

Referring to FIG. 2, a thick solid line indicates a first voltage supplied to the first load 210 in a normal power state, and a thin solid line indicates a second voltage supplied to the second load 220 in a normal power state. A thick dotted line indicates first voltage redundancy in the event of failure in the first converter 121, and a thin dotted line indicates second voltage redundancy in the event of failure in the second converter 122.

In a normal power state, the first controller 131 may control the first switch 151 to be turned on to supply the first voltage output from the first converter 121 to the first load 210 and the second battery 111. When a failure occurs in the first converter 121 or short-circuit occurs between the first converter 121 and the first controller 131, the second battery 111 may supply the first voltage to the first load 210.

Also, the first controller 131 may supply the first voltage to the third converter 141 for stability of power supply.

The third converter 141 may convert the first voltage supplied from the first controller 131 into the second voltage and output to the second controller 132. The third converter 141 may convert the first voltage into the second voltage and continuously supply to the second controller 132, thereby enabling the second controller 132 to stably supply power to the second load 220 in the event of failure in the second converter 122.

The second controller 132 may control the second switch 152 to be turned on to supply the second voltage output from the second converter 122 to the second load 220 and the third battery 112. When a failure occurs in the second converter 122 or short-circuit occurs between the second converter 122 and the second controller 132, the third battery 112 may supply the second voltage to the second load 220.

Also, the second controller 132 may supply the second voltage to the fourth converter 142 for stability of power supply.

The fourth converter 142 may convert the second voltage supplied from the second controller 132 into the first voltage and output to the first controller 131. The fourth converter 142 may convert the second voltage into the first voltage and continuously supply to the first controller 131, thereby enabling the first controller 131 to stably supply power to the first load 210 in the event of failure in the first converter 121.

Figure 3:
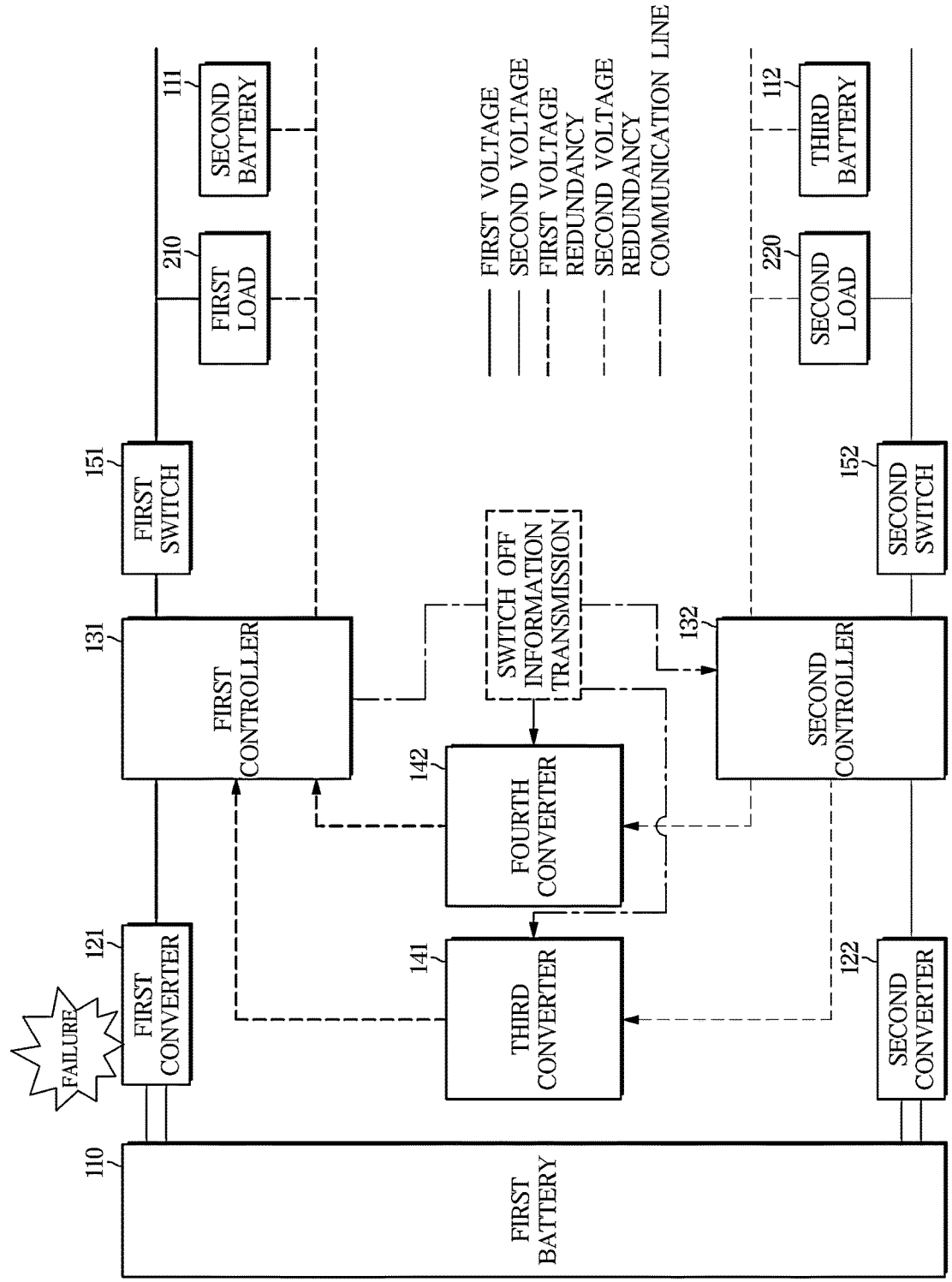
FIG. 3 is a conceptual diagram illustrating an example of a configuration in an event of failure in a first converter of a power supply apparatus according to an embodiment.
Figure 4:
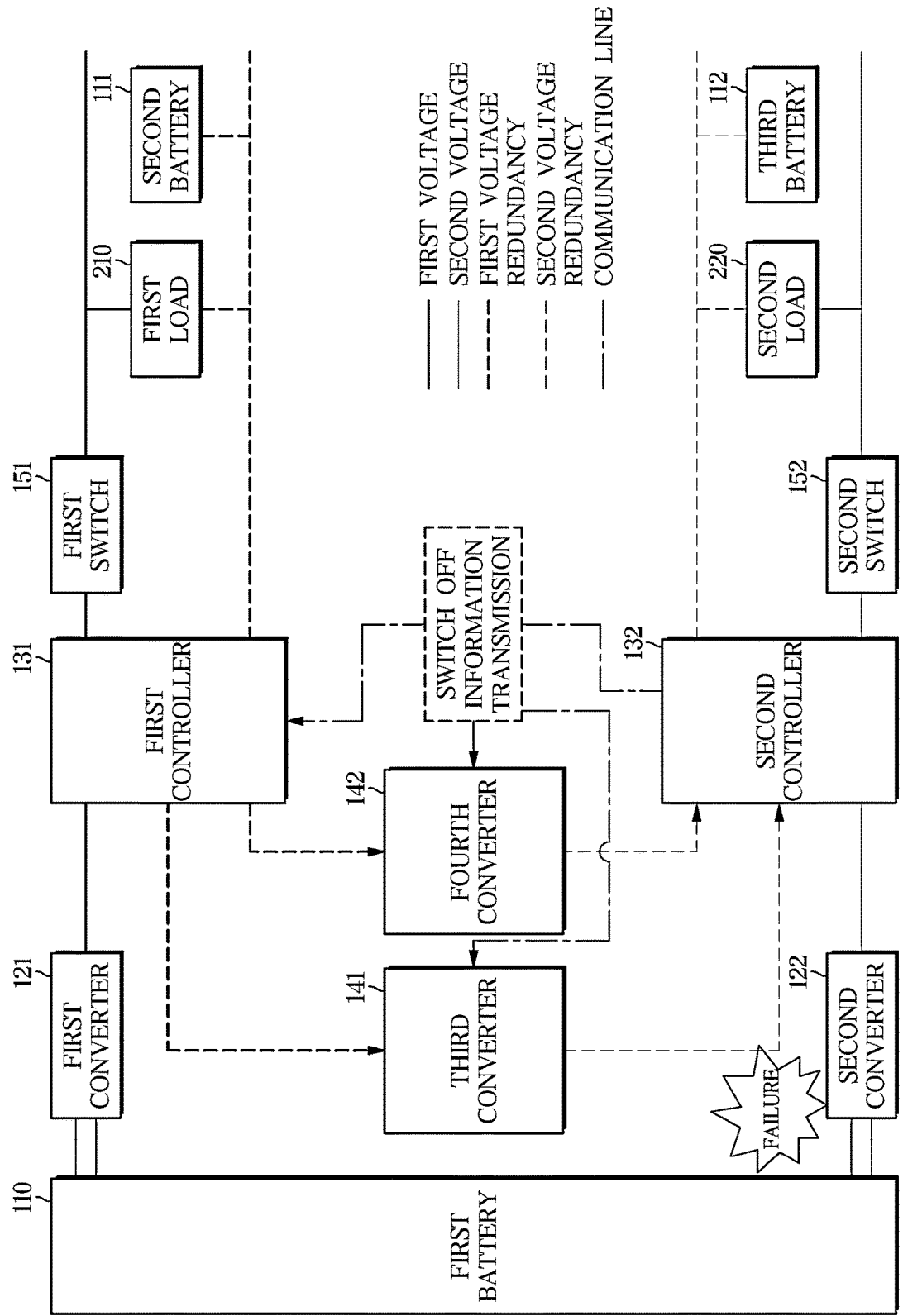
FIG. 4 is a conceptual diagram illustrating an example of a configuration in an event of failure in a second converter of a power supply apparatus according to an embodiment.

FIG. 3 is a conceptual diagram illustrating an example of a configuration in the event of failure in a first converter of a power supply apparatus according to an embodiment. FIG. 4 is a conceptual diagram illustrating an example of a configuration in an event of failure in a second converter of a power supply apparatus according to an embodiment.

Referring to FIG. 3, when a failure occurs in the first converter 121, power may not be supplied to the first load 210 along a thick solid line, but the power supply apparatus 100 may supply power to the first load 210 along a thick dotted line.

The first controller 131 may receive a signal from the first converter 121. For example, the first controller 131 may receive a signal about an output state of the first converter 121. Also, the first controller 131 may determine whether a failure occurs in the first converter 121 based on processing of the signal received from the first converter 121.

The first controller 131 may generate a control signal for turning off the first switch 151 based on the determination of the failure in the first converter 121. Also, when the first switch 151 is turned off, the first controller 131 may transmit switch-off information to the second controller 132, the third converter 141 and the fourth converter 142.

The second controller 132 may receive the switch-off information from the first controller 131, and then supply the second voltage to the third converter 141.

The third converter 141 may convert the second voltage supplied from the second controller 132 into the first voltage, and output to the first controller 131. When a failure occurs in the first converter 121, the third converter 141 may convert the second voltage into the first voltage and supply to the first controller 131, and thus the first controller 131 may stably supply power to the first load 210, even in the event of failure in the first converter 121.

Referring to FIG. 4, when a failure occurs in the second converter 122, power may not be supplied to the second load 220 along a thin solid line, but the power supply apparatus 100 may supply power to the second load 220 along a thin dotted line.

The second controller 132 may receive a signal from the second converter 122. For example, the second controller 132 may receive a signal about an output state of the second converter 122. Also, the second controller 132 may determine whether a failure occurs in the second converter 122 based on processing of the signal received from the second converter 122.

The second controller 132 may generate a control signal for turning off the second switch 152 based on the determination of the failure in the second converter 122. Also, when the second switch 152 is turned off, the second controller 132 may transmit switch-off information to the first controller 131, the third converter 141 and the fourth converter 142.

The first controller 131 may receive the switch-off information from the second controller 132, and then supply the first voltage to the fourth converter 142.

The fourth converter 142 may convert the first voltage supplied from the first controller 131 into the second voltage, and output to the second controller 132. When a failure occurs in the second converter 122, the fourth converter 142 may convert the first voltage into the second voltage and supply the second voltage to the second controller 132, and thus the second controller 132 may stably supply power to the second load 220, even in the event of failure in the second converter 122.

Figure 5:
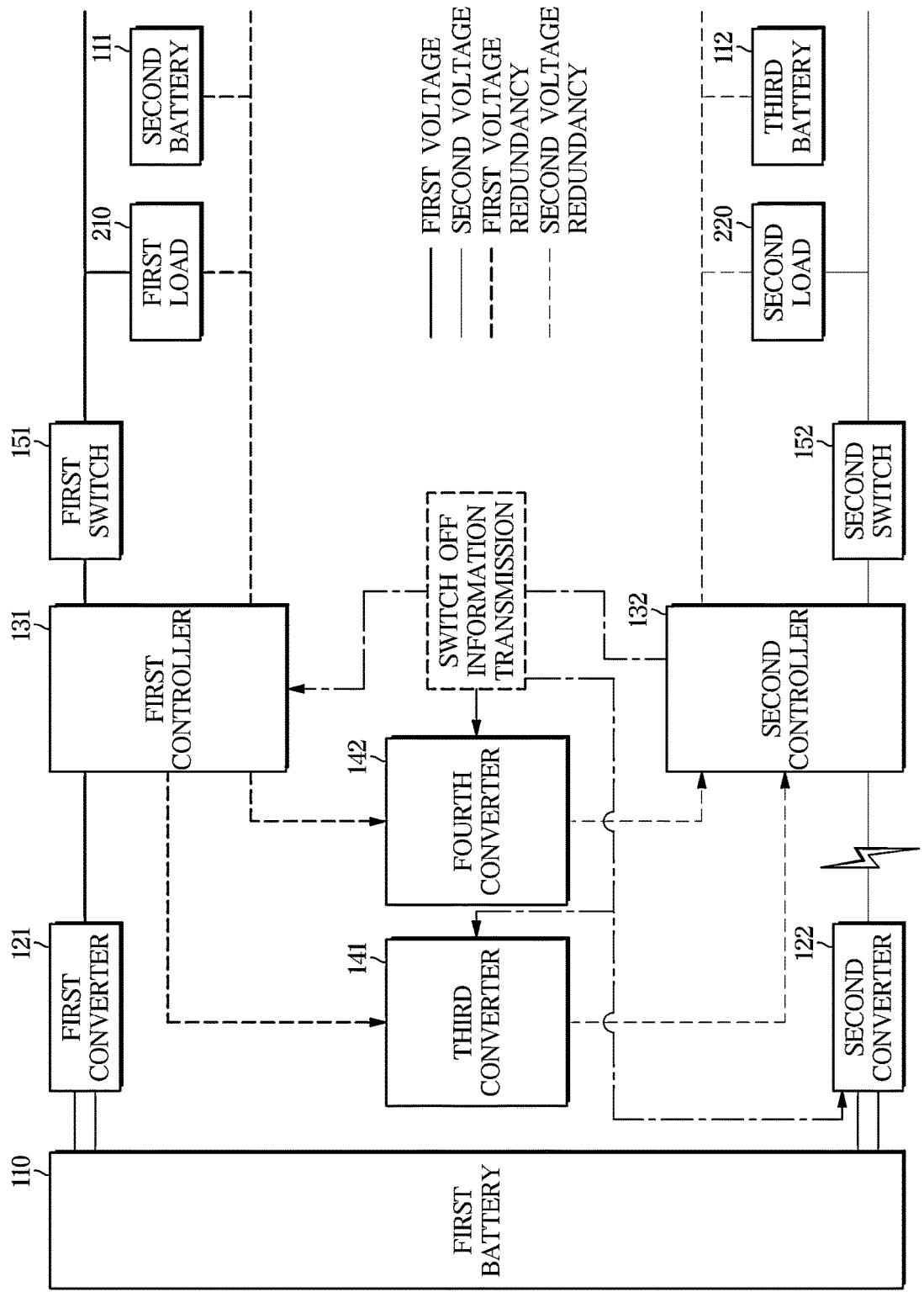
FIG. 5 is a conceptual diagram illustrating an example of a configuration when short-circuit occurs between a first converter and a first controller in a power supply apparatus according to an embodiment.

FIG. 5 is a conceptual diagram illustrating an example of a configuration when short-circuit occurs between a first converter and a first controller in a power supply apparatus according to an embodiment.

Referring to FIG. 5, the first controller 131 may determine whether short-circuit occurs between the first converter 121 and the first controller 131 based on processing of a signal received from the first converter 121.

When short-circuit occurs, the first controller 131 may turn off the first switch 151 and transmit switch-off information to the second controller 132, the third converter 141, and the fourth converter 142. The second controller 132, the third converter 141, and the fourth converter 142 receiving the switch-off information may perform the above-described operation of supplying the first voltage to the first controller 131.

Furthermore, the first controller 131 may transmit the switch-off information to the first converter 121.

The first converter 121 may receive the switch-off information from the first controller 131, and then stop an operation of stepping down a high voltage input from the first battery 110 to the first voltage.

Figure 6:
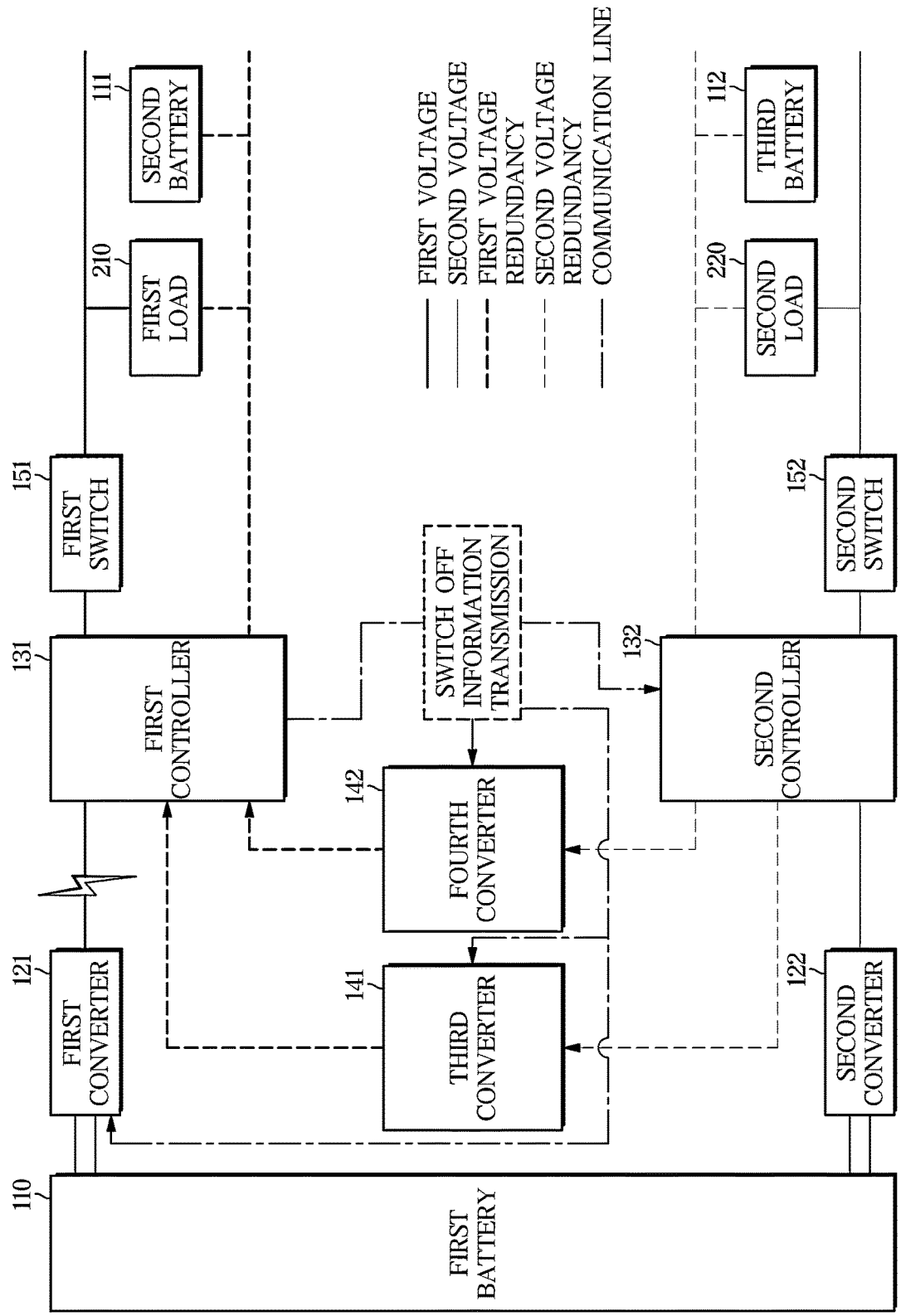
FIG. 6 is a conceptual diagram illustrating an example of a configuration when short-circuit occurs between a second converter and a second controller in a power supply apparatus according to an embodiment.

FIG. 6 is a conceptual diagram illustrating an example of a configuration when short-circuit occurs between a second converter and a second controller in a power supply apparatus according to an embodiment.

Referring to FIG. 6, the second controller 132 may determine whether short-circuit occurs between the second converter 122 and the second controller 132 based on processing of a signal received from the second converter 122.

When short-circuit occurs, the second controller 132 may turn off the second switch 152 and transmit switch-off information to the first controller 131, the third converter 141, and the fourth converter 142. The first controller 131, the third converter 141, and the fourth converter 142 receiving the switch-off information may perform the above-described operation of supplying the second voltage to the second controller 132.

Furthermore, the second controller 132 may transmit the switch-off information to the second converter 122.

The second converter 122 may receive the switch-off information from the second controller 132, and then stop an operation of stepping down a high voltage input from the first battery 110 to the second voltage.

Figure 7:
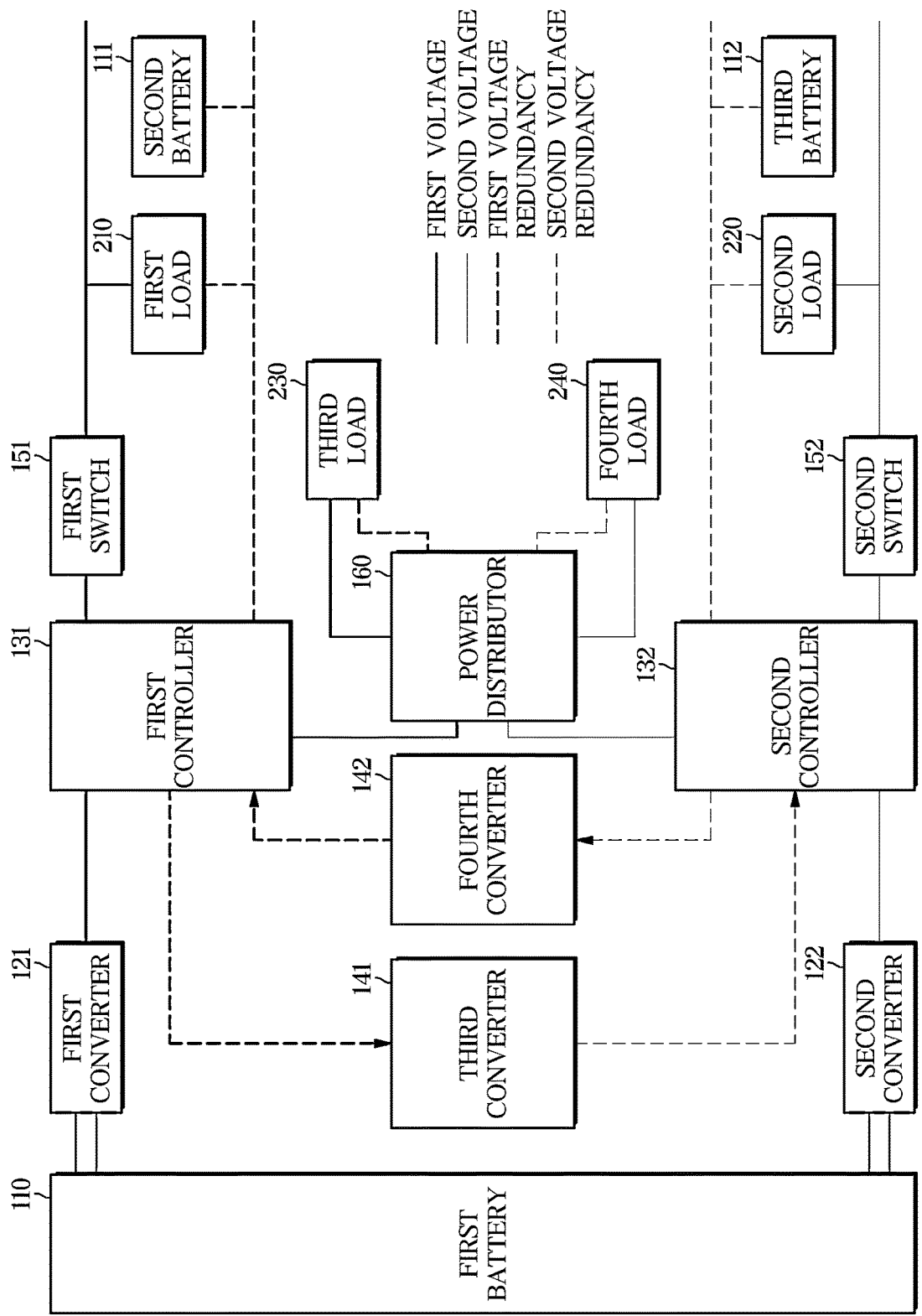
FIG. 7 is a conceptual diagram illustrating an example of a configuration of a power supply apparatus including a power distributor according to an embodiment.

FIG. 7 is a conceptual diagram illustrating an example of a configuration of a power supply apparatus including a power distributor according to an embodiment.

A power distributor 160 may be positioned in a room of powertrain electrics (PE) of the vehicle 1 and be electrically connected to an output terminal of the first controller 131 and an output terminal of the second controller 132. The power distributor 160 may distribute power supplied from the first controller 131 to a third load 230, and distribute power supplied from the second controller 132 to a fourth load 240.

Figure 8:
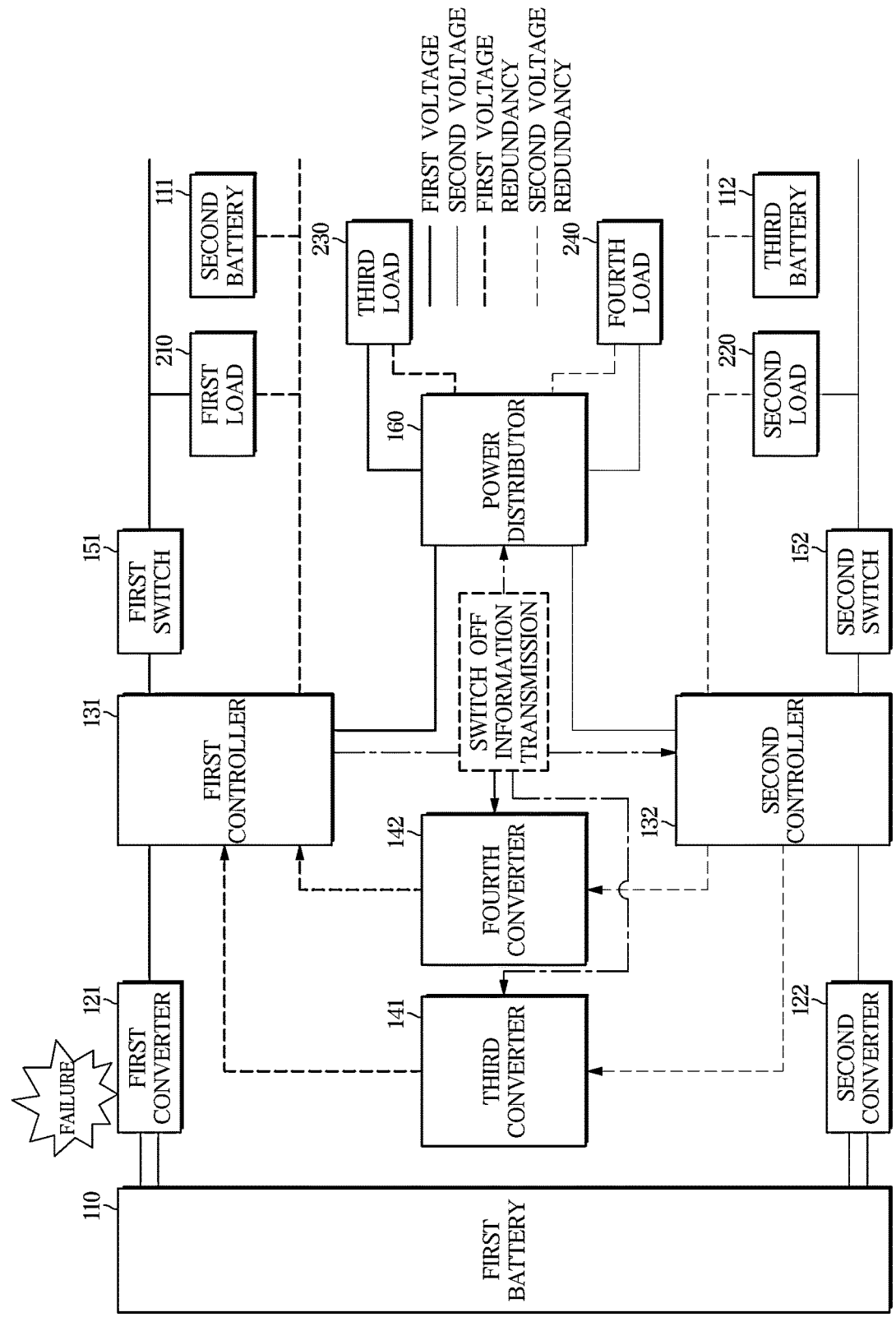
FIG. 8 is a conceptual diagram illustrating an example of a configuration in an event of failure in a first converter of a power supply apparatus including a power distributor according to an embodiment.
Figure 9:
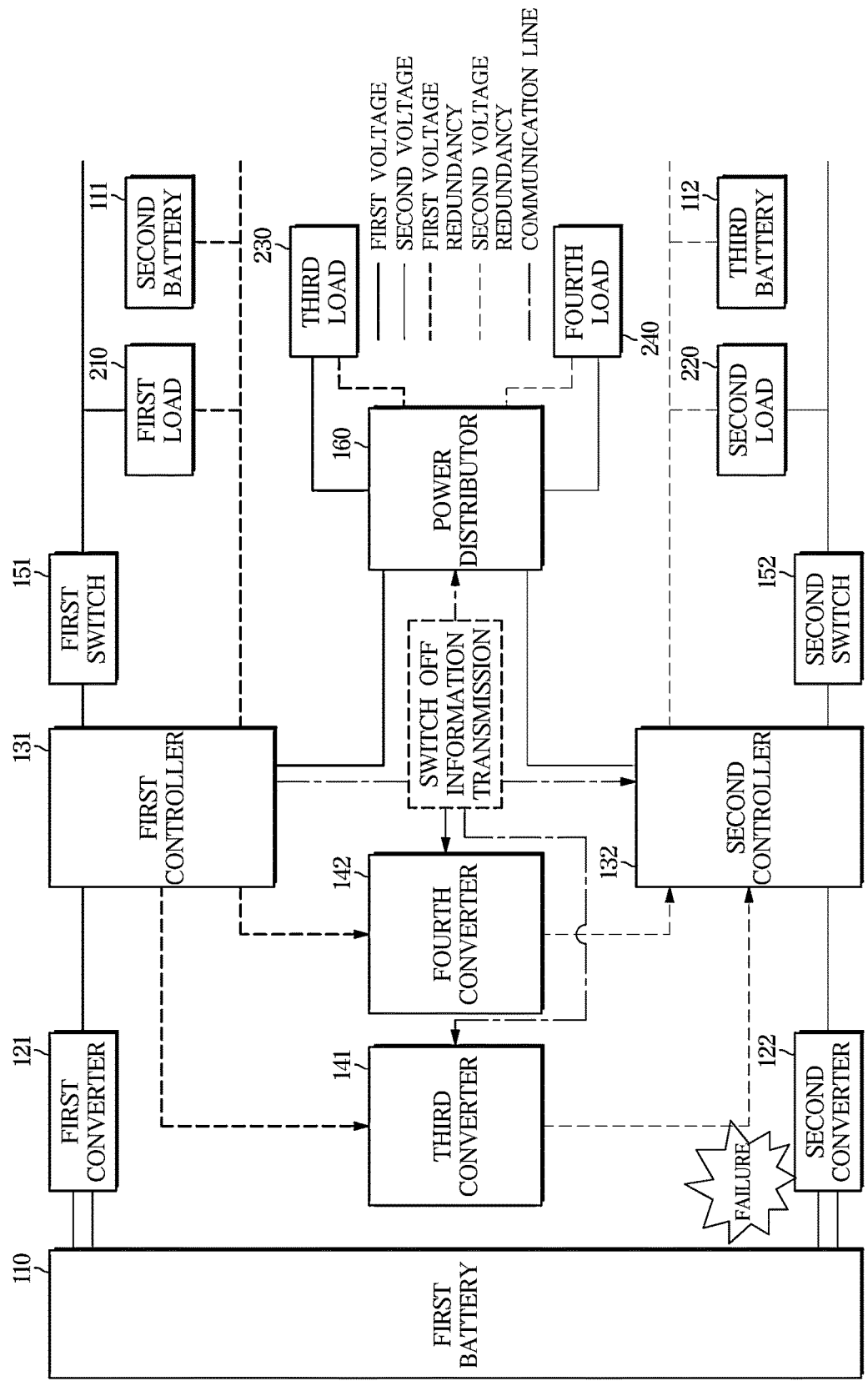
FIG. 9 is a conceptual diagram illustrating an example of a configuration in an event of failure in a second converter of a power supply apparatus including a power distributor according to an embodiment.

FIG. 8 is a conceptual diagram illustrating an example of a configuration in the event of failure in a first converter of a power supply apparatus including a power distributor according to an embodiment. FIG. 9 is a conceptual diagram illustrating an example of a configuration in the event of failure in a second converter of a power supply apparatus including a power distributor according to an embodiment.

Referring to FIG. 8, when a failure occurs in the first converter 121, the power distributor 160 may not supply power to the third load 230 along a thick solid line, but may supply power to the third load 230 along a thick dotted line.

The first controller 131 may determine whether a failure occurs in the first converter 121. When it is determined that a failure occurs in the first converter 121, the first controller 131 may turn off the first switch 151 and transmit switch-off information to the second controller 132, the third converter 141, and the fourth converter 142. The second controller 132, the third converter 141, and the fourth converter 142 receiving the switch-off information may perform the above-described operation of supplying the first voltage to the first controller 131.

The first controller 131 may supply the supplied first voltage to the power distributor 160 and transmit the switch-off information to the power distributor 160.

When the switch-off information is received, the power distributor 160 may distribute power to only a predetermined load. The predetermined load refers to a load related to autonomous driving of the vehicle 1 and a driving essential load. For example, the predetermined load may include at least one of a drive motor, a control unit of the vehicle 1, a camera, a radar, a light detection and ranging (lidar), or an ultrasonic sensor obtaining information around the vehicle 1.

Referring to FIG. 9, when a failure occurs in the second converter 122, the power distributor 160 may not supply power to the fourth load 240 along a thick solid line, but may supply power to the fourth load 240 along a thick dotted line.

The second controller 132 may determine whether a failure occurs in the second converter 122. When it is determined that a failure occurs in the second converter 122, the second controller 132 may turn off the second switch 152 and transmit switch-off information to the first controller 131, the third converter 141, and the fourth converter 142. The first controller 131, the third converter 141, and the fourth converter 142 receiving the switch-off information may perform the above-described operation of supplying the second voltage to the second controller 132.

The second controller 132 may supply the supplied second voltage to the power distributor 160 and transmit the switch-off information to the power distributor 160.

When the switch-off information is received, the power distributor 160 may distribute power to only a predetermined load. The predetermined load refers to a load related to autonomous driving of the vehicle 1 and a driving essential load. For example, the predetermined load may include at least one of a drive motor, a control unit of the vehicle 1, a camera, a radar, a lidar, or an ultrasonic sensor obtaining information around the vehicle 1.

The above-described operations may be equally applied when short-circuit occurs between the first converter 121 and the first controller 131 and between the second converter 122 and the second controller 132.

Figure 10:
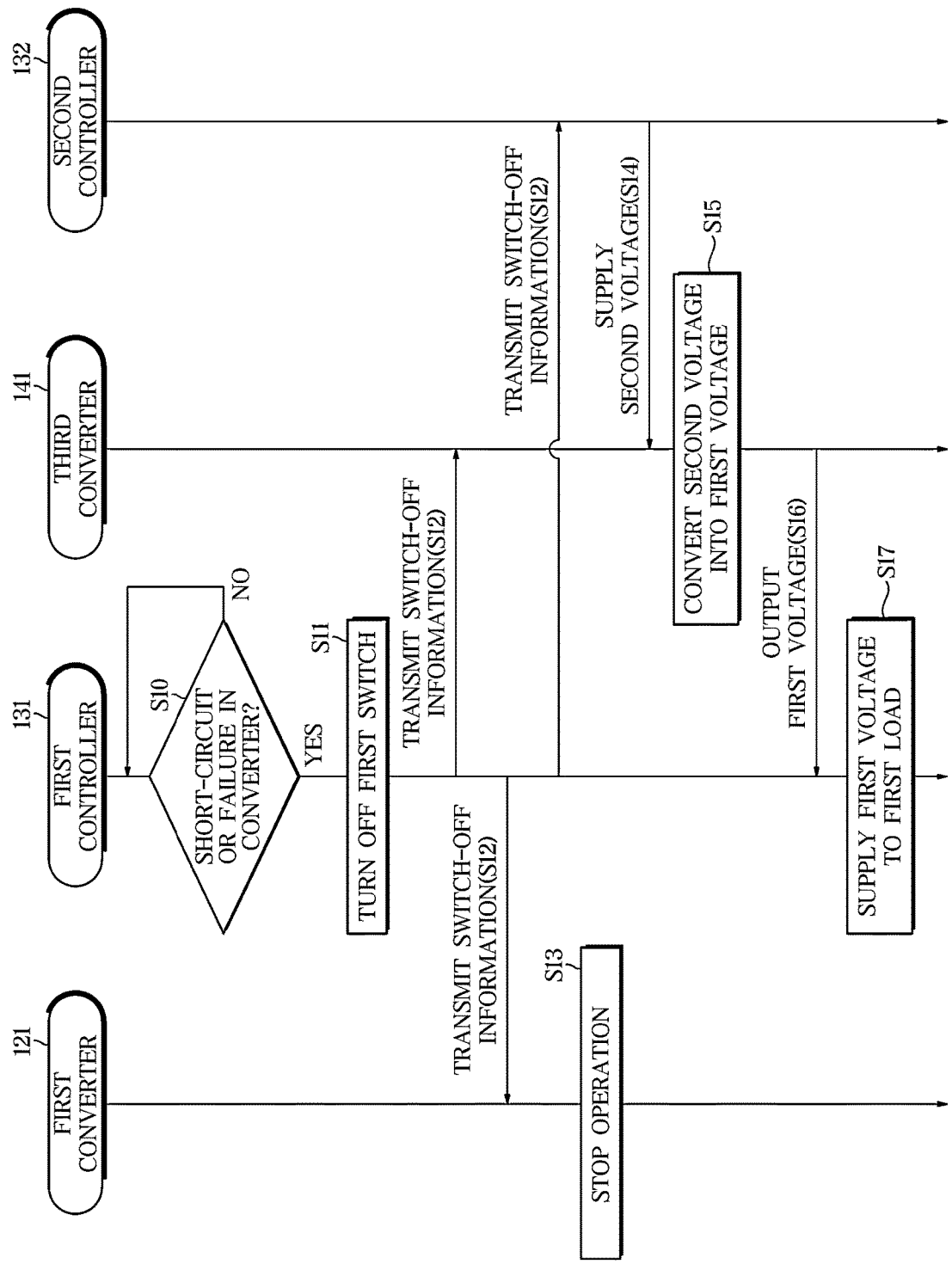
FIG. 10 is a flowchart illustrating an example of a control method in an event of failure in a first converter, in a control method of a power supply apparatus according to an embodiment.

FIG. 10 is a flowchart illustrating an example of a control method in the event of failure in a first converter, in a control method of a power supply apparatus according to an embodiment.

The first controller 131 may receive a signal about an output state of the first converter 121. Also, based on processing of the signal received from the first converter 121, the first controller 131 may determine whether a failure occurs in the first converter 121 or short-circuit occurs between the first converter 121 and the first controller 131 (S10).

The first controller 131 may generate a control signal for turning off the first switch 151 based on a determination that the failure occurs in the first converter 121 (S11). Also, when the first switch 151 is turned off, the first controller 131 may transmit switch-off information to the first converter 121, the second controller 132 and the third converter 141 (S12).

After receiving the switch-off information from the first controller 131, the first converter 121 may stop an operation of stepping down a high voltage input from the first battery 110 to a first voltage (S13).

The second controller 132 may receive the switch-off information from the first controller 131, and then supply a second voltage to the third converter 141 (S14).

The third converter 141 may convert the second voltage supplied from the second controller 132 into the first voltage (S15) and output the first voltage to the first controller 131 (S16). The third converter 141 may convert the second voltage into the first voltage and supply to the first controller 131 in the event of failure in the first converter 121, and thus the first controller 131 may stably supply power to the first load 210 (S17), even in the event of failure in the first converter 121.

FIG. 11 is a flowchart illustrating an example of a control method in the event of failure in a second converter, in a power supply apparatus according to an embodiment.

The second controller 132 may receive a signal about an output state of the second converter 122. Also, based on processing of the signal received from the second converter 122, the second controller 132 may determine whether a failure occurs in the second converter 122 or short-circuit occurs between the second converter 122 and the second controller 132 (S20).

The second controller 132 may generate a control signal for turning off the second switch 152 based on a determination that the failure occurs in the second converter 122 (S21). Also, when the second switch 152 is turned off, the second controller 132 may transmit switch-off information to the second converter 122, the first controller 131 and the fourth converter 142 (S22).

After receiving the switch-off information from the second controller 132, the second converter 122 may stop an operation of stepping down a high voltage input from the first battery 110 to a second voltage (S23).

The first controller 131 may receive the switch-off information from the second controller 132, and then supply a first voltage to the fourth converter 142 (S24).

The fourth converter 142 may convert the first voltage supplied from the first controller 131 into the second voltage (S25), and output the second voltage to the second controller 132 (S26). The fourth converter 142 may convert the first voltage into the second voltage and supply to the second controller 132 in the event of failure in the second converter 122, and thus the second controller 132 may stably supply power to the second load 220 (S27), even in the event of failure in the second converter 122.

As should be apparent from above, according to embodiments of the disclosure, the power supply apparatus and a vehicle comprising the same can supply backup power in the event of vehicle power failure.

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions may be decoded by a computer are stored of, for example, a read-only memory (ROM), random-access memory (RAM), magnetic tapes, magnetic disks, flash memories, optical recording medium, and the like.

Although embodiments have been described for illustrative purposes, those having ordinary skill in the art should appreciate that various modifications, additions and substitutions are possible, without departing from the scope and spirit of the present disclosure. Therefore, embodiments have not been described for limiting purposes.

What is claimed is:
1. A power supply apparatus, comprising:
a first battery configured to supply power;
a first converter configured to step down a voltage output from the first battery to a first voltage;
a second converter configured to step down the voltage output from the first battery to a second voltage lower than the first voltage;
a third converter configured to convert the first voltage into the second voltage;
a fourth converter configured to convert the second voltage into the first voltage;
a first controller configured to supply the first voltage output from the first converter to at least one of a first load or the third converter; and
a second controller configured to supply the second voltage output from the second converter to at least one of a second load or the fourth converter.

2. The power supply apparatus of claim 1, further comprising
a first switch configured to connect the first converter and the first load,
wherein the first controller is configured to determine whether a failure or short-circuit occurs in the first converter based on a signal received from the first converter and control the first switch based on the determination.

3. The power supply apparatus of claim 2, wherein the first controller is configured to transmit a first switch-off signal to at least one of the first converter, the second controller, or the third converter, in response to the first switch being turned off.

4. The power supply apparatus of claim 3, wherein the first converter is configured to stop stepping down the voltage output from the first battery, in response to receiving the first switch-off signal from the first controller,
wherein the second controller is configured to supply the second voltage to the third converter, in response to receiving the first switch-off signal from the first controller.

5. The power supply apparatus of claim 4, wherein the third converter is configured to convert the second voltage into the first voltage, in response to receiving the first switch-off signal from the first controller,
wherein the first controller is configured to supply the first load with the first voltage converted by at least one of the third converter or the fourth converter.

6. The power supply apparatus of claim 1, further comprising
a second switch configured to connect the second converter and the second load,
wherein the second controller is configured to determine whether a failure or short-circuit occurs in the second converter based on a signal received from the second converter and control the second switch based on the determination.

7. The power supply apparatus of claim 6, wherein the second controller is configured to transmit a second switch-off signal to at least one of the second converter, the first controller, or the fourth converter, in response to the second switch being turned off.

8. The power supply apparatus of claim 7, wherein the second converter is configured to stop stepping down the voltage, in response to receiving the second switch-off signal from the second controller,
wherein the first controller is configured to supply the first voltage to the fourth converter, in response to receiving the second switch-off signal from the second controller.

9. The power supply apparatus of claim 8, wherein the fourth converter is configured to convert the first voltage into the second voltage, in response to receiving the second switch-off signal from the second controller.

10. The power supply apparatus of claim 9, wherein the second controller is configured to supply the second load with the second voltage converted by at least one of the third converter or the fourth converter.

11. The power supply apparatus of claim 1, further comprising
a power distributor configured to distribute the first and the second voltage supplied from the first controller and the second controller to a third load and a fourth load.

12. The power supply apparatus of claim 11, further comprising
a first switch configured to connect the first converter and the first load,
wherein the first controller is configured to determine whether a failure or short-circuit occurs in the first converter based on a signal received from the first converter, and control the first switch based on the determination, and
wherein the power distributor is configured to distribute a voltage to only a predetermined load, in response to receiving a first switch-off signal from the first controller.

13. The power supply apparatus of claim 11, further comprising
a second switch configured to connect the second converter and the second load,
wherein the second controller is configured to determine whether a failure or short-circuit occurs in the second converter based on a signal received from the second converter, and control the second switch based on the determination, and
wherein the power distributor is configured to distribute a voltage to only a predetermined load, in response to receiving a second switch-off signal from the second controller.

14. A vehicle, comprising:
a first battery configured to supply power;
a first converter configured to step down a voltage output from the first battery to a first voltage;
a second converter configured to step down the voltage output from the first battery to a second voltage lower than the first voltage;
a third converter configured to convert the first voltage into the second voltage;
a fourth converter configured to convert the second voltage into the first voltage;
a first controller configured to supply the first voltage output from the first converter to at least one of a first load or the third converter; and
a second controller configured to supply the second voltage output from the second converter to at least one of a second load or the fourth converter.

15. The vehicle of claim 14, further comprising
a first switch configured to connect the first converter and the first load,
wherein the first controller is configured to:
determine whether a failure or short-circuit occurs in the first converter based on a signal received from the first converter, and control the first switch based on the determination, and
transmit a first switch-off signal to at least one of the first converter, the second controller, or the third converter, in response to the first switch being turned off.

16. The vehicle of claim 15, wherein the first converter is configured to stop stepping down the voltage, in response to receiving the first switch-off signal from the first controller.

17. The vehicle of claim 15, wherein the second controller is configured to supply the second voltage to the third converter, in response to receiving the first switch-off signal from the first controller,
wherein the third converter is configured to convert the second voltage into the first voltage, in response to receiving the first switch-off signal from the first controller, and
wherein the first controller is configured to supply the first load with the first voltage converted by at least one of the third converter or the fourth converter.

18. The vehicle of claim 14, further comprising
a second switch configured to connect the second converter and the second load, wherein the second controller is configured to:
determine whether a failure or short-circuit occurs in the second converter based on a signal received from the second converter, and control the second switch based on the determination, and
transmit a second switch-off signal to at least one of the second converter, the first controller, or the fourth converter, in response to the second switch being turned off.

19. The vehicle of claim 18, wherein the second converter is configured to stop stepping down the voltage, in response to receiving the second switch-off signal from the second controller.

20. The vehicle of claim 19, wherein the first controller is configured to supply the first voltage to the fourth converter, in response to receiving the second switch-off signal from the second controller,
wherein the fourth converter is configured to convert the first voltage into the second voltage, in response to receiving the second switch-off signal from the second controller, and
wherein the second controller is configured to supply the second load with the second voltage converted by at least one of the third converter or the fourth converter.

* * * * *